(12) United States Patent
Haefner et al.

(10) Patent No.: US 11,479,084 B2
(45) Date of Patent: Oct. 25, 2022

(54) FUEL CONNECTION UNIT

(71) Applicant: Eberspächer Climate Control Systems GmbH, Esslingen (DE)

(72) Inventors: Michael Haefner, Stuttgart (DE); Hans Jensen, Dettingen (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 206 days.

(21) Appl. No.: 16/505,152

(22) Filed: Jul. 8, 2019

(65) Prior Publication Data
US 2020/0009942 A1 Jan. 9, 2020

(30) Foreign Application Priority Data
Jul. 9, 2018 (DE) ...................... 10 2018 116 523.4

(51) Int. Cl.
*B60H 1/22* (2006.01)
*F23K 5/02* (2006.01)

(52) U.S. Cl.
CPC ............. *B60H 1/2203* (2013.01); *F23K 5/02* (2013.01); *B60H 2001/2271* (2013.01); *B60H 2001/2284* (2013.01); *F23D 2900/21002* (2013.01); *F23K 2400/20* (2020.05); *F23N 2241/14* (2020.01)

(58) Field of Classification Search
USPC .................................................. 237/12.3 c
See application file for complete search history.

(56) References Cited

U.S. PATENT DOCUMENTS

| 2,290,298 A | | 7/1942 | Spackman |
| 3,849,055 A | | 11/1974 | Stanley et al. |
| 5,653,387 A | * | 8/1997 | Takayanagi .......... B60H 1/2212 237/12.3 C |
| 2008/0213106 A1 | * | 9/2008 | Schmidt .............. F04B 11/0033 417/410.1 |
| 2017/0260944 A1 | * | 9/2017 | Williams ............... F02M 37/44 |
| 2019/0105969 A1 | | 4/2019 | Haefner et al. |

FOREIGN PATENT DOCUMENTS

| DE | 31 36 839 A1 | 3/1983 |
| DE | 202004015442 U1 | 2/2006 |
| DE | 10 2005 015117 A1 | 10/2006 |
| DE | 102016107207 A1 | 9/2017 |
| DE | 102017123046 A1 | 4/2019 |
| KR | 1020050001590 A1 | 1/2005 |

\* cited by examiner

*Primary Examiner* — Steven B McAllister
*Assistant Examiner* — John E Bargero
(74) *Attorney, Agent, or Firm* — McGlew and Tuttle, P.C.

(57) ABSTRACT

A fuel connection unit (10) for a fuel-operated vehicle heater (18) includes a connection unit body (12), which can be arranged at a heater housing (16). A fuel release line connection area (32) connects a fuel release line leading to a combustion chamber. A fuel feed line connection area (46) projects from the connection unit body (12) for connecting a fuel feed line. At least one functional unit (50), for influencing the flow of fuel in a fuel flow volume (36) formed in the connection unit body (12), is provided in the connection unit body (12).

15 Claims, 4 Drawing Sheets

FUEL CONNECTION UNIT

CROSS REFERENCE TO RELATED APPLICATIONS

This application claims the benefit of priority under 35 U.S.C. § 119 of German Application 10 2018 116 523.4, filed Jul. 9, 2018, the entire contents of which are incorporated herein by reference.

TECHNICAL FIELD

The present invention pertains to a fuel connection unit, by means of which a fuel-operated vehicle heater can be connected to a fuel reservoir and the fuel flowing in from a fuel reservoir can be introduced into the heater.

TECHNICAL BACKGROUND

Such a fuel connection unit is known from the subsequently published German patent application DE 10 2017 123 046. This prior-art fuel connection unit comprises a disk-like connection unit body, which is or can be arranged in a corresponding opening of a heater housing. On a side facing the interior of the heater housing, a fuel release line connection area leads away from the connection unit body. A fuel release line leading to a burner area in the interior of the heater can be connected to this fuel release line connection area in order to guide fuel in the direction of a porous evaporator medium provided in the burner area. A fuel feed line connection area extends away from the connection unit body on an outwardly exposed side of the connection unit body in a direction opposite the extension of the fuel release line connection area. A fuel feed line feeding fuel from a reservoir can be connected to this fuel feed line connection area.

SUMMARY

An object of the present invention is to provide a fuel connection unit for a fuel-operated vehicle heater, which supports an improved functionality of a vehicle heater and has a compact design.

This object is accomplished according to the present invention by a fuel connection unit for a fuel-operated vehicle heater, comprising a connection unit body, which is to be arranged at a heater housing; a fuel release line connection area projecting from the connection unit body for connecting a fuel release line leading to a combustion chamber; and a fuel feed line connection area projecting from the connection unit body for connecting a fuel feed line, wherein at least one functional unit (also referred to as a flow conditioning means or flow influencing means) for influencing the fuel flow in a fuel flow volume formed in the connection unit body is provided in the connection unit body.

By integrating a functional unit into the fuel connection unit, it becomes possible to influence the flow characteristic of fuel flowing through the fuel connection unit without a corresponding functional unit having to be provided for this purpose elsewhere. This leads to a small space needed for installation, on the one hand, and it makes it possible, on the other hand, to achieve the function to be provided by such a functional unit close to the vehicle heater.

This effect can be utilized in an especially advantageous manner especially when the at least one functional unit comprises a pulsation damper. It is thus ensured that such a pulsation damper can smoothen or eliminate fluctuations in the fuel pressure very close to the location at which the fuel is released into a burner area.

With a configuration that can be embodied in a simple manner, the pulsation damper can comprise a pressure equalization volume and a flexible separating element separating the pressure equalization volume from the fuel flow volume in the connection unit body.

For the integration into the fuel connection unit, provisions may be made for the pulsation damper to comprise a pulsation body providing a pressure equalization volume, wherein the flexible separating element is fixed at the pulsation damper body such that it closes the pressure equalization volume, wherein a damper mounting recess receiving the pulsation damper may further preferably be provided in the connection unit body.

In another type of configuration, the at least one functional unit may comprise a fuel valve. The feed or release of fuel or fuel vapor can thus be interrupted or released in the immediate vicinity of the burner area of such a vehicle heater.

It is proposed in an embodiment that is especially advantageous for preventing waste gas emissions that the fuel valve comprise a nonreturn valve blocking the fuel connection unit against flow in the direction from the fuel release line area to the fuel feed line connection area.

Provisions may be made in this connection in the interest of a simple integration of such a nonreturn valve for the nonreturn valve to comprise a prestressing element supported at a first connection unit body part, preferably a prestressing spring, and a valve element, preferably a valve ball, which is pressed by the prestressing element against a valve seat at a second connection unit body part.

Further, a release of the fuel flow, which release is to be performed corresponding to the required operation, may be made possible by the fuel valve comprising an on-off valve, which can be actuated for releasing and blocking a flow path from the fuel feed line connection area to the fuel release line connection area.

In another embodiment variant, the at least one functional unit may comprise a fuel pump.

The fuel pump comprises, for example, an electromagnet unit, which is carried stationarily at the connection unit body, and a pump piston, which can be moved linearly to and fro in a pump chamber, as well as an armature provided at the pump piston for the magnetic interaction with the electromagnet unit, wherein the pump piston can be moved by electrical excitation of the electromagnet unit in the direction of fuel discharge from the pump chamber and by a prestressing element, preferably a prestressing spring, in the fuel uptake direction in the pump chamber. Such a fuel pump is configured as a metering pump, in which the pump piston acting as a pumping element is moved for delivering fuel under the driving effect of the electromagnetic drive unit. As an alternative, such a fuel pump may comprise as drive unit a piezo element, which changes its shape during electrical excitation and acts as a pumping element in the process or moves a pumping element for delivering fuel.

In another embodiment variant, the at least one functional unit may comprise a fuel filter.

To make it possible to provide the stroke, which is necessary for the delivery of fuel, for a pumping element or the space needed therefor, it is proposed that the fuel feed line connection area and the fuel release line connection area be arranged flush with one another.

In an embodiment that can be configured in an especially simple manner, the connection unit body may be configured integrally with the fuel feed line connection area and with the fuel release line connection area, i.e., as a block of material manufactured, for example, in a molding process.

The present invention further pertains to a fuel-operated vehicle heater, comprising a fuel connection unit configured according to the present invention, which is inserted into a heater housing.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
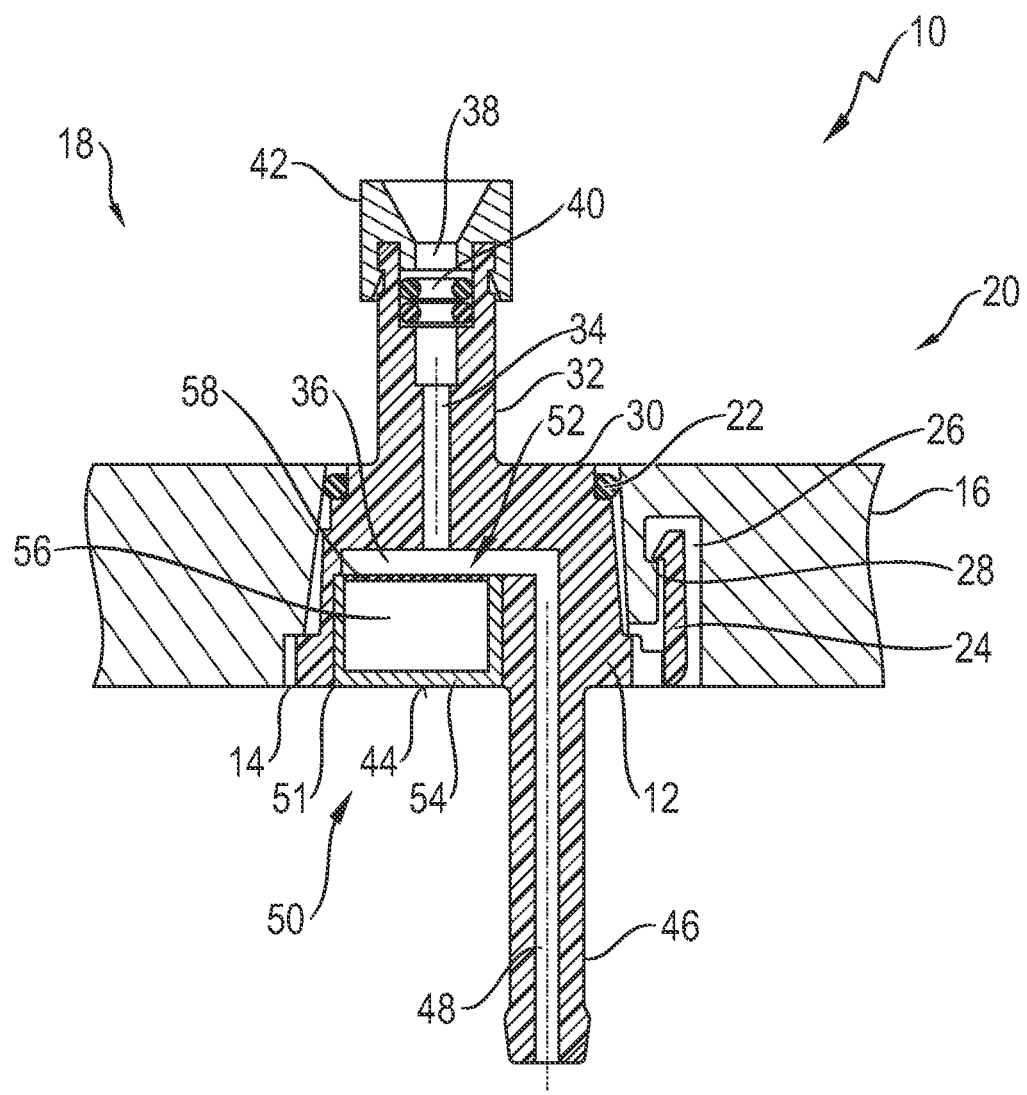
FIG. 1 is a longitudinal sectional view of a fuel connection unit for a fuel-operated vehicle heater.

Referring to the drawings, a fuel connection unit for a fuel-operated vehicle heater is generally designated by 10 in FIG. 1. The fuel connection unit 10 comprises a disk-like connection unit body 12, which is inserted into an opening 14 of a heater housing 16 of a vehicle heater, generally designated by 18, wherein said opening 14 is associated with this vehicle heater 18. To bring about a sealed closure, the connection unit body 12 may be surrounded, for example, in its area facing the interior 10 of the heater housing 16, by a sealing element 22, which can be clamped between this and the heater housing 16. A locking element 24, which, meshing with a locking recess 26 of the heater housing 16, extends behind a locking projection 28 and thus prevents the fuel connection unit 10 from being pulled out or falling out of the opening 14, is provided at the connection unit body 12 for a permanent holding together of the heater housing 16 and the fuel connection unit 10. A plurality of such locking elements 24 may be provided over the circumference of the connection unit body 12 provided in a disk-like shape.

On the side 30 of the connection unit body 12, which side is to be positioned facing the interior 20 of the heater housing 16, a fuel release line connection area 32 extends from this connection unit body 12. This fuel release line connection area 32, configured in the manner of a pipe branch, has in its interior a fuel duct 34, which is open, on the one hand, towards a fuel flow volume 36 formed in the connection unit body 12, and receives, for example, two sealing elements 40 in an expanded end area 38, on the other hand. A holding element 42, which has a funnel-like shape, holds the sealing elements 40 in the fuel duct 34 and through which a fuel release line extending in the interior 20 of the heater housing 16 can be inserted, is carried at the expanded end area 38. After the insertion, the fuel release line, which is made, for example, of a metallic material as a rigid pipe, is also connected by the clamping effect of the sealing elements 40 to the fuel release line area 32 such that it is secured against the discharge of fuel.

Offset from the fuel release connection line area 32, a fuel feed line connection area 46 extends from the connection unit body 12 on the side 44 to be arranged such that it is oriented facing outwards. This fuel feed line connection area 32 is also configured in the manner of a pipe branch and provides in its interior a fuel duct 48, which is open towards the fuel flow volume 36 in the connection unit body 12. A fuel line, configured, for example, as a flexible tube, may be pushed over the fuel feed line connection area 46 in order to guide fuel flowing in from a fuel reservoir into the fuel flow volume 36 and via this into the fuel duct 34.

The connection unit body 12 is made integral with the fuel release line connection area 32, with the fuel feed line connection area 46 and with the locking element or locking elements 24, i.e., as one block of material, for example, in a molding process and from, for example, a plastic material.

A functional unit (flow conditioning means/flow influencing means), generally designated by 50, is provided at the connection unit element 12 of the fuel connection unit 10. The functional unit 50 is configured in the exemplary embodiment being shown as a pulsation damper 52 and it comprises a pot-like pulsation damper body 54, which is received in a damper mounting recess 51 and in which a pressure equalization volume 56, filled, for example, with gas, e.g., air, is provided. The pressure equalization volume 56 is closed in the direction of the fuel flow volume 36 by a flexible, for example, membrane-like separating element 58 carried permanently at the pulsation damper body 54.

Based on the flexibility of the separating element 58 and the compressibility of the gas present in the pressure equalization volume 56, pressure fluctuations in the fuel flowing through the fuel flow volume 36 can be smoothened and ideally eliminated while the separating element 58 undergoes deformation and the gas contained in the pressure equalization volume 56 is compressed.

For a permanent holding together, the pulsation damper body 54 can be pressed into the connection unit body 12 or/and it can be fixed thereon or therein by connection in substance, especially bonding or welding. The separating element 58 may also be connected to the pulsation damper body 54, for example, by bonding or welding.

Figure 2:
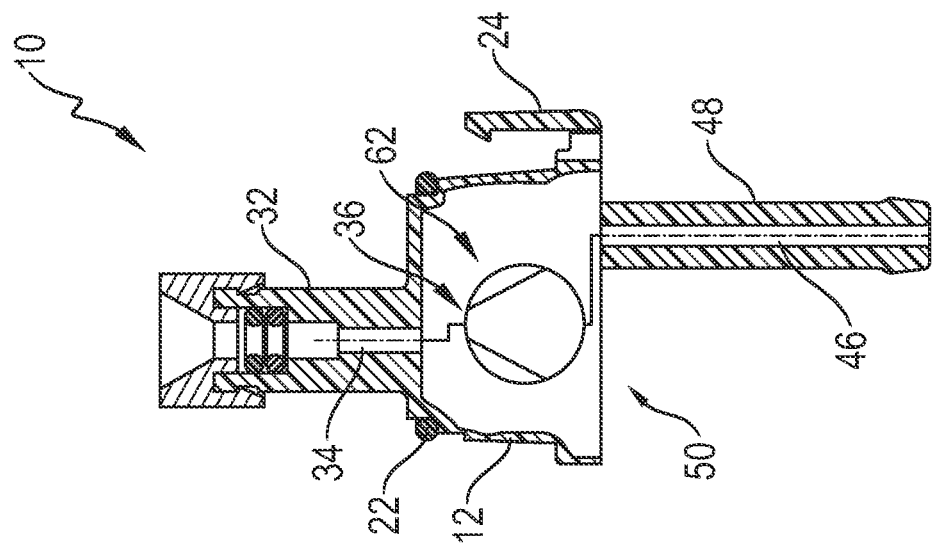
FIG. 2 is a partially schematic view of an alternative embodiment of a fuel connection unit.
Figure 3:
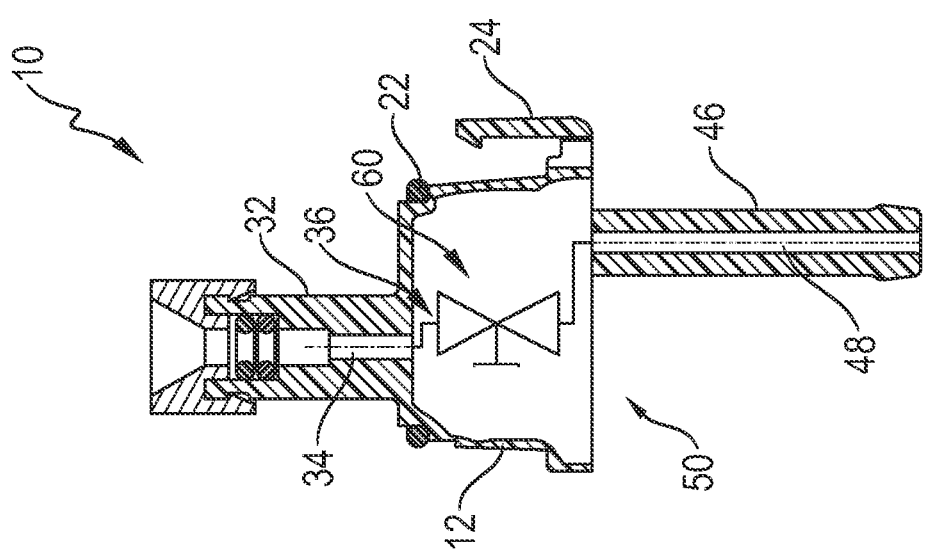
FIG. 3 is another, partially schematic view of an alternative embodiment of a fuel connection unit.

Types of configuration of fuel connection units, which will be described in even more detail below, are shown in FIGS. 2 and 3. A fuel valve, generally designated by 60, is arranged as a functional unit in the connection unit body 12 in the type of configuration shown in FIG. 2. This fuel valve can establish and block a flow connection between the fuel ducts 48, 34 in order thus to prevent the entry of fuel into the vehicle heater 18 and to prevent the emission of fuel vapor from the burner area of the vehicle heater 18.

A fuel pump 62 is arranged as a functional unit 50 in the connection unit body 12 of the fuel connection unit 10 in the type of configuration shown in FIG. 3. Liquid fuel delivered from a fuel reservoir can be delivered by the fuel pump 62 in the direction of the burner area of the vehicle heater 18.

Figure 4:
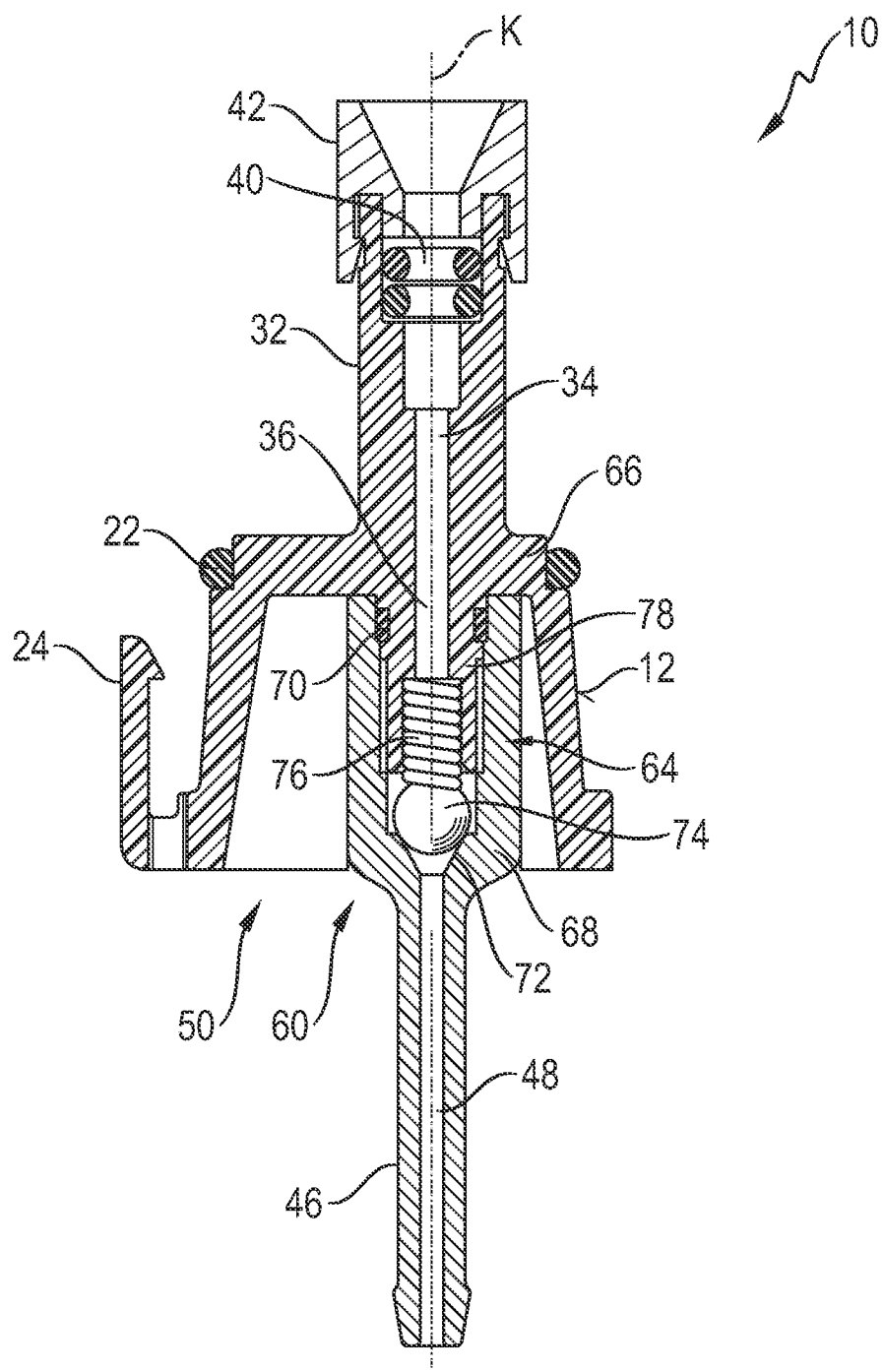
FIG. 4 is a fuel connection unit with a nonreturn valve integrated into a connection unit body.

FIG. 4 shows an embodiment of a connection unit 10, in which a fuel valve 60, especially a nonreturn valve 64, is provided as a functional unit 50 in the connection unit body 12.

The connection unit body 12 is made of two parts in this embodiment. A first connection body part 66 has the fuel release line connection area 32 with the fuel duct 34 formed therein, whose inner end also forms or is a part of the fuel flow volume 36. The first part 66 of the connection unit body 12 is to be inserted into the opening 14 of the heater housing 16 in the above-described manner and it also has, for example, the locking element 24.

A second connection unit body part 68 is connected to the first connection unit body part 66 in a fluid-tight manner via an O-ring-like sealing element 70 and it has the fuel feed line connection area 46 with the fuel duct 48 formed therein. It can be seen in FIG. 4 that the fuel release line connection area 32 and the fuel feed line connection area 46 are arranged flush with one another, so that the fuel ducts 34, 48 formed in them extend such that they axially extend one another in the direction of a duct longitudinal axis K and are not offset laterally in relation to the duct longitudinal axis K.

A valve seat 72, which has, for example, a conical shape and on which a valve element configured as a valve ball can sit, is formed at the second connection unit body part 68. A prestressing element 76 configured as a compression coil spring is supported, on the one hand, at a section 78 of the first connection unit body part 66, which said section is positioned such that it also meshes with the second connection unit body part 68 and presses in the process the valve element 74 against the valve seat 72 thereof. Even though a flow of fuel is thus possible when a corresponding fuel pressure is provided in the fuel duct 48, while the prestressing element 76 is compressed, through the fuel duct 48, the fuel flow volume 36 and the fuel duct 34 to a burner area of a vehicle heater, a flow in the opposite direction and also the discharge of fuel gases present in the burner area are, however, prevented by the nonreturn valve 64.

Figure 5:
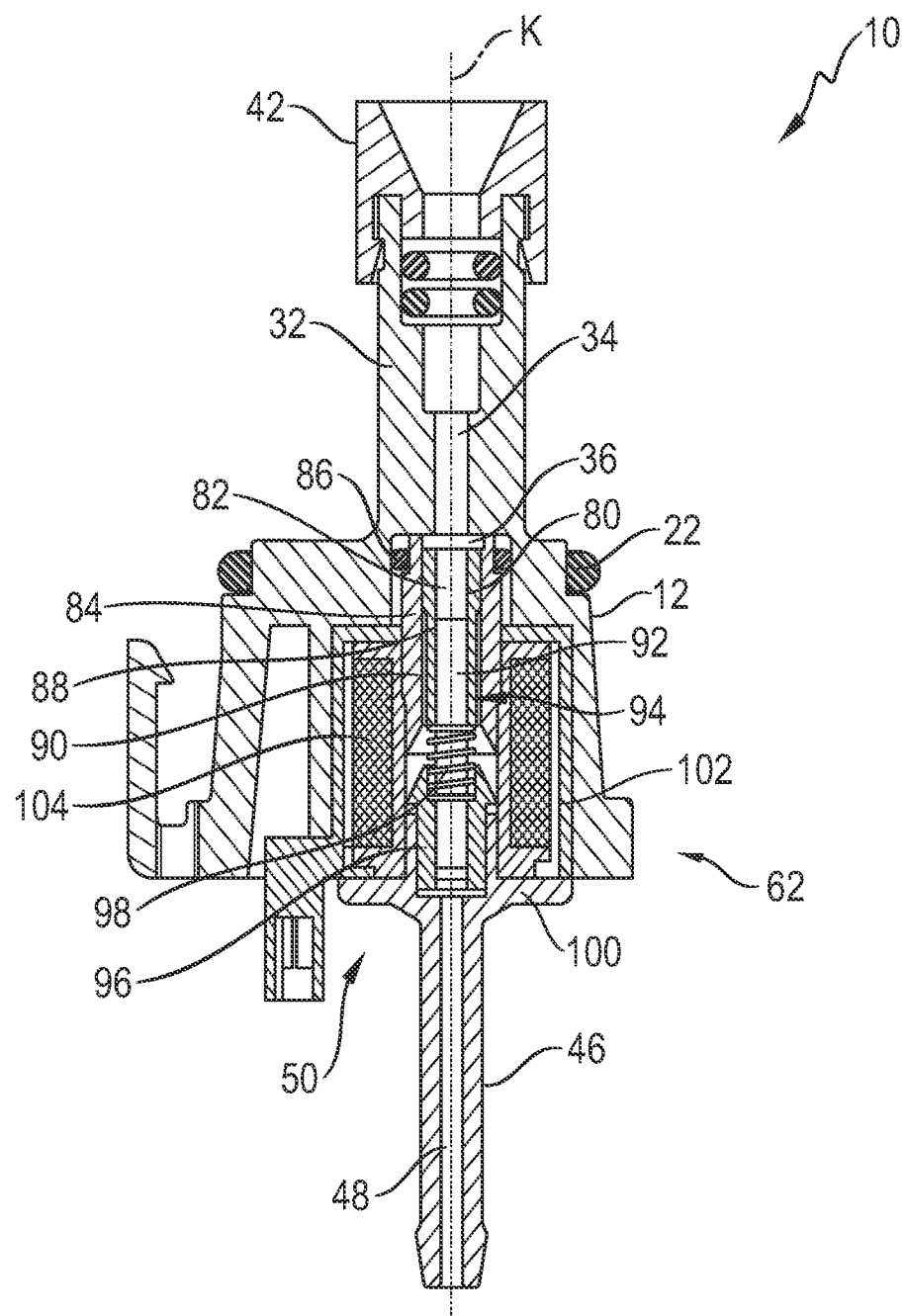
FIG. 5 is a fuel connection unit with a metering pump integrated into a connection unit body.

FIG. 5 shows a fuel connection unit 10, in which a fuel pump 62 generally also called metering pump, is provided as a functional unit 50 in a variant of the embodiment shown schematically in FIG. 3.

The fuel pump 62 comprises in the connection unit body 12 a pump chamber insert 80 with a pump chamber 82 elongated therein in the direction of a duct longitudinal axis K. The pump chamber insert 80 is surrounded by a pump housing 84, which is carried at the connection unit body 12 via the intermediary of a sealing element 86 and forms, together with a length area of the pump chamber insert 80, a ring-like feed volume 90 open via openings 88 to the pump chamber 82.

A pumping element 94 providing a pump piston 92 can be moved to and fro in the pump chamber 82 in the direction of the duct longitudinal axis K, and it should also be noted in the case of the type of configuration of a fuel connection unit 10, which is shown in FIG. 5, that the two fuel ducts 34, 48 are arranged flush with one another in the direction of the duct longitudinal axis K.

An armature 96 is arranged at an area of the pump piston 92, which area is not located in the pump chamber insert 80. A prestressing element 98, which is configured as a compression coil spring and which thus prestresses the pump piston 92 in the direction from the pump chamber 82 and into contact with a part 100 of the fuel connection unit 10, which said part provides the fuel feed line connection area 46, is supported at the pump chamber insert 80, on the one hand, and at the armature 96, on the other hand.

An electromagnet unit 102 with an electrically excitable coil array 104 is permanently carried as a part of a drive unit 101 at or in the connection unit body 12. A magnetic interaction with the armature 96 is generated by exciting the coil array 104, and, to discharge fuel, this interaction causes this armature 96, to move into the interior of the electromagnet unit 102 and thus moves the pump piston 92 in the direction in which the volume of the pump chamber 82, which volume is filled with fuel, is reduced. It should be noted in this connection that for a defined guiding of fuel downstream of the pump chamber 82, for example, at the beginning of the fuel duct 34, a nonreturn valve only allowing the flow of fuel in the direction into the fuel duct 34 may be provided, and a nonreturn valve only allowing the flow of fuel in the direction of the pump chamber 82 may correspondingly also be provided upstream of the pump chamber 82, for example, at the end of the fuel duct 48.

Due to an alternating reciprocating motion, fuel is correspondingly alternatingly received in the pump chamber 82 via the fuel duct 48 and discharged from the pump chamber 82 into the fuel duct 34. A defined volume of fuel is discharged from the pump chamber 82 during each such motion of the pump piston 92 and is delivered in the direction of a burner area of the heater, so that a metered quantity of the fuel to be delivered to the burner area can be pumped due to the setting of the working frequency of such a fuel pump 62.

It should finally be noted that functional units having another configuration, which act on the fuel flow and hence on the fuel being delivered, may also be provided in such a fuel connection unit. In particular, for example, as a functional unit having an alternative configuration may comprise a fuel filter with a sieve-like (sieve) filter element integrated into the connection unit body, so that the fuel flowing in via the fuel duct 48 must first flow through this sieve filter element and can then flow farther into the fuel duct 34, purified from possibly entrained particles.

While specific embodiments of the invention have been shown and described in detail to illustrate the application of the principles of the invention, it will be understood that the invention may be embodied otherwise without departing from such principles.

What is claimed is:

1. A fuel-operated vehicle heater comprising: a heater housing having a fuel connection unit receiving opening; and a fuel connection unit connected to the heater housing, the fuel connection unit comprising: a connection unit body inserted into the fuel connection unit receiving opening of the heater housing, and surrounded by a sealing element clamped between an outer circumference of the connection unit body and the heater housing, a fuel flow volume being provided in the connection unit body; a fuel release line connection area configured as a pipe branch and projecting from the connection unit body on a side of the connection unit body facing an interior of the heater housing, the fuel release line connection area providing a fuel duct open towards the fuel flow volume in the connection unit body; a fuel release line connected to the fuel release line connection area and leading to a combustion chamber; a fuel feed line connection area configured as a pipe branch and projecting from the connection unit body on a side of the connection unit body facing outwards for connecting a fuel feed line, the fuel feed line connection area providing a fuel duct open towards the fuel flow volume in the connection unit body; and at least one functional unit for influencing a flow of fuel in the fuel flow volume, the at least one flow influencing means being provided in the connection unit body.

2. The fuel-operated vehicle heater in accordance with claim 1, wherein the at least one flow influencing means comprises a pulsation damper.

3. The fuel-operated vehicle heater in accordance with claim 2, wherein the pulsation damper comprises a pressure equalization volume and a flexible separating element separating the pressure equalization volume from the fuel flow volume.

4. The fuel-operated vehicle heater in accordance with claim 3, wherein:
- the pulsation damper further comprises a pulsation damper body providing the pressure equalization volume;
- the flexible separating element is fixed at the pulsation damper body such that the flexible separating element closes the pressure equalization volume.

5. The fuel-operated vehicle heater in accordance with claim 3, wherein a damper mounting recess receiving the pulsation damper is formed in the connection unit body.

6. The fuel-operated vehicle heater in accordance with claim 1, wherein the at least one flow influencing means comprises a fuel valve.

7. The fuel-operated vehicle heater in accordance with claim 6, wherein the fuel valve comprises a nonreturn valve blocking the fuel connection unit against flow in a direction from the fuel release line connection area to the fuel feed line connection area.

8. The fuel-operated vehicle heater in accordance with claim 7, wherein the nonreturn valve comprises:
- a second connection unit body part with a valve seat;
- a prestressing element supported at a first connection unit body part; and
- a valve element pressed by the prestressing element against the valve seat.

9. The fuel-operated vehicle heater in accordance with claim 6, wherein the fuel valve comprises an on-off valve, which can be actuated for releasing and blocking a flow path from the fuel feed line connection area to the fuel release line connection area.

10. The fuel-operated vehicle heater in accordance with claim 1, wherein the at least one flow influencing means comprises a fuel pump.

11. The fuel-operated vehicle heater in accordance with claim 10, wherein the fuel pump comprises a pumping element movable to and fro for delivery of fuel and an electrically excitable drive unit associated with the pumping element.

12. The fuel-operated vehicle heater in accordance with claim 11, wherein the drive unit comprises:
- an electromagnet unit carried stationarily at the connection unit body;
- a pump piston movable linearly to and fro in a pump chamber; and
- an armature provided at the pump piston for the magnetic interaction with the electromagnet unit, wherein the pump piston is moveable, by electrical excitation of the electromagnet unit, in a direction in which fuel is discharged from the pump chamber and the armature is moveable by a prestressing element in a direction in which fuel is received in the pump chamber.

13. The fuel-operated vehicle heater in accordance with claim 1, wherein the at least one flow influencing means comprises a fuel filter.

14. The fuel-operated vehicle heater in accordance with claim 1, wherein the fuel feed line connection area and the fuel release line connection area are arranged flush with one another.

15. The fuel-operated vehicle heater in accordance with claim 1, wherein the connection unit body is disk-shaped.

* * * * *